United States Patent
Kishizoe

(10) Patent No.: US 10,189,318 B2
(45) Date of Patent: Jan. 29, 2019

(54) PNEUMATIC TIRE HAVING SPECIFIED GROUNDING TREAD

(71) Applicant: The Yokohama Rubber Co., LTD., Minato-ku, Tokyo (JP)

(72) Inventor: Isamu Kishizoe, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 997 days.

(21) Appl. No.: 14/405,145

(22) PCT Filed: Sep. 28, 2012

(86) PCT No.: PCT/JP2012/075209
§ 371 (c)(1),
(2) Date: Dec. 2, 2014

(87) PCT Pub. No.: WO2014/049862
PCT Pub. Date: Apr. 3, 2014

(65) Prior Publication Data
US 2015/0158344 A1    Jun. 11, 2015

(51) Int. Cl.
*B60C 19/08* (2006.01)
*B60C 11/00* (2006.01)

(52) U.S. Cl.
CPC .......... *B60C 19/082* (2013.01); *B60C 11/005* (2013.01); *B60C 19/08* (2013.01);
(Continued)

(58) Field of Classification Search
CPC ..... B60C 19/082; B60C 19/08; B60C 19/084; B60C 19/088; B60C 19/086; B60C 11/005; B29D 2030/526; Y10S 152/02
(Continued)

(56) References Cited

U.S. PATENT DOCUMENTS 6,269,854 B1   8/2001   Matsuo et al.
6,868,878 B2 *   3/2005   Janajreh .................. B60C 19/08
                                      152/DIG. 2X
(Continued)

FOREIGN PATENT DOCUMENTS

DE   10 2006 050 840 A1 *   4/2008
EP        0 838 353        4/1998
(Continued)

OTHER PUBLICATIONS

English machine translation of JP 11-20426 A, Jan. 26, 1999.*
(Continued)

*Primary Examiner* — Adrienne C. Johnstone
(74) *Attorney, Agent, or Firm* — Thorpe North & Western

(57) ABSTRACT

A pneumatic tire includes a carcass layer, a belt layer, a tread rubber having a cap tread and an undertread, a pair of side wall rubbers, a pair of rim cushion rubbers, and a grounding tread that is exposed to a road contact surface of the tread rubber and that penetrates the cap tread and the undertread to contact the belt layer in an electrically conductive manner. The grounding tread includes a widened portion having a cross-sectional area that widens toward a contact surface with the belt layer at the contact portion with the belt layer. The widened portion of the grounding tread has a profile shape that bulges outward in a tire width direction.

14 Claims, 10 Drawing Sheets

(52) U.S. Cl.
CPC .......... B60C 19/084 (2013.01); B60C 19/088 (2013.01); *B60C 2011/0025* (2013.01); *B60C 2011/0033* (2013.01); *Y10S 152/02* (2013.01)

(58) Field of Classification Search
USPC .............................. 152/152.1, DIG. 2, 209.5
See application file for complete search history.

(56) References Cited

U.S. PATENT DOCUMENTS

| | | | | |
|---|---|---|---|---|
| 7,766,060 | B2* | 8/2010 | Ogawa ................... | B60C 19/08 152/152.1 |
| 7,819,152 | B2* | 10/2010 | Marriott ................. | B60C 19/08 152/152.1 |
| 8,413,697 | B2* | 4/2013 | De Monte ............. | B60C 19/082 152/152.1 |
| 9,333,812 | B2* | 5/2016 | Nagai ................... | B60C 19/082 |
| 2007/0125466 | A1 | 6/2007 | Nagahara | |

FOREIGN PATENT DOCUMENTS

| | | | |
|---|---|---|---|
| JP | H10-175403 | | 6/1998 |
| JP | 11020426 | A * | 1/1999 |
| JP | 11139107 | A * | 5/1999 |
| JP | H11-170814 | | 6/1999 |
| JP | 3287795 | | 6/2002 |
| JP | 2005-255048 | | 9/2005 |
| JP | 3763640 | | 4/2006 |
| JP | 2007-153092 | | 6/2007 |
| JP | 2008-308083 | | 12/2008 |
| JP | 2010115935 | A * | 5/2010 |

OTHER PUBLICATIONS

English machine translation of JP 11-139107 A, May 25, 1999.*
English machine translation of JP 2010-115935 A, May 27, 2010.*
Mechanics of Pneumatic Tires, ed. Samuel Clark, US Department of Transportation, Aug. 1991, p. 216.*
Mechanics of Pneumatic Tires, ed. Samuel Clark, US Dept. of Transportation, Aug. 1981, pp. 25-27.*
International Search Report for International Application No. PCT/JP2012/075209 dated Dec. 25, 2012, 4 pages, Japan.

* cited by examiner

| | | Conventional Example | Comparative Example | Working Example 1 | Working Example 2 |
|---|---|---|---|---|---|
| Earthing tread contact surface | | Undertread outer circumferential surface | Belt layer outer circumferential surface | Belt layer outer circumferential surface | Belt layer outer circumferential surface |
| Widened portion of earthing tread | | No (straight shape) | No (straight shape) | Yes | Yes |
| Undertread thickened portion | | No (uniform gauge) | No (uniform gauge) | Yes | Yes |
| W1 | mm | 1.0 | 1.0 | 1.0 | 1.0 |
| W2 | mm | 1.0 | 1.0 | 2.0 | 2.0 |
| G1 | mm | 1.5 | 1.5 | 1.5 | 1.5 |
| G2 | mm | 1.5 | 1.5 | 1.5 | 2.5 |
| G2/G1 | | 1.0 | 1.0 | 1.0 | 1.7 |
| Contact length between earthing tread and belt layer and undertread | mm | 1.0 | 4.0 | 5.0 | 7.0 |
| tan δ ut | | 0.20 | 0.20 | 0.20 | 0.20 |
| α | ° | - | - | 70 | 70 |
| D2/D1 | | - | - | 0.2 | 0.2 |
| Cap tread resistivity | Ω·cm | $1 \times 10^8$ | $1 \times 10^8$ | $1 \times 10^{13}$ | $1 \times 10^{13}$ |
| Undertread resistivity | Ω·cm | $1 \times 10^8$ | $1 \times 10^8$ | $1 \times 10^8$ | $1 \times 10^8$ |
| Belt layer coating rubber resistivity | Ω·cm | $1 \times 10^5$ | $1 \times 10^5$ | $1 \times 10^5$ | $1 \times 10^5$ |
| Carcass layer coating rubber resistivity | Ω·cm | $1 \times 10^5$ | $1 \times 10^5$ | $1 \times 10^5$ | $1 \times 10^5$ |
| Rim cushion rubber resistivity | Ω·cm | $1 \times 10^5$ | $1 \times 10^5$ | $1 \times 10^5$ | $1 \times 10^5$ |
| Wing tip resistivity | Ω·cm | $1 \times 10^6$ | $1 \times 10^6$ | $1 \times 10^9$ | $1 \times 10^9$ |
| Electrical resistance value | Ω | $2 \times 10^9$ | $7 \times 10^8$ | $2 \times 10^7$ | $3 \times 10^6$ |
| Separation resistance performance | | 100 | 95 | 100 | 100 |
| Dry/wet steering stability performance | | 100 | 100 | 105 | 105 |
| Low rolling resistance performance | | 100 | 95 | 100 | 103 |

FIG. 6a

| | | Working Example 3 | Working Example 4 | Working Example 5 | Working Example 6 |
|---|---|---|---|---|---|
| Earthing tread contact surface | | Belt layer outer circumferential surface | Belt layer outer circumferential surface | Belt layer outer circumferential surface | Belt layer outer circumferential surface |
| Widened portion of earthing tread | | Yes | Yes | Yes | Yes |
| Undertread thickened portion | | Yes | Yes | Yes | Yes |
| W1 | mm | 2.0 | 3.0 | 1.0 | 1.0 |
| W2 | mm | 3.0 | 5.0 | 2.0 | 2.0 |
| G1 | mm | 1.5 | 1.5 | 1.5 | 1.5 |
| G2 | mm | 1.5 | 1.5 | 2.25 | 3.75 |
| G2/G1 | | 1.0 | 1.0 | 1.5 | 2.5 |
| Contact length between earthing tread and belt layer and undertread | mm | 6.0 | 8.0 | 6.5 | 9.5 |
| tan δ ut | | 0.20 | 0.20 | 0.20 | 0.20 |
| α | ° | 70 | 70 | 70 | 70 |
| D2/D1 | | 0.2 | 0.2 | 0.2 | 0.2 |
| Cap tread resistivity | Ω·cm | $1\times10^{13}$ | $1\times10^{13}$ | $1\times10^{13}$ | $1\times10^{13}$ |
| Undertread resistivity | Ω·cm | $1\times10^{8}$ | $1\times10^{8}$ | $1\times10^{8}$ | $1\times10^{8}$ |
| Belt layer coating rubber resistivity | Ω·cm | $1\times10^{5}$ | $1\times10^{5}$ | $1\times10^{5}$ | $1\times10^{5}$ |
| Carcass layer coating rubber resistivity | Ω·cm | $1\times10^{5}$ | $1\times10^{5}$ | $1\times10^{5}$ | $1\times10^{5}$ |
| Rim cushion rubber resistivity | Ω·cm | $1\times10^{5}$ | $1\times10^{5}$ | $1\times10^{5}$ | $1\times10^{5}$ |
| Wing tip resistivity | Ω·cm | $1\times10^{9}$ | $1\times10^{9}$ | $1\times10^{9}$ | $1\times10^{9}$ |
| Electrical resistance value | Ω | $8\times10^{6}$ | $1\times10^{6}$ | $5\times10^{6}$ | $7\times10^{5}$ |
| Separation resistance performance | | 100 | 105 | 100 | 100 |
| Dry/wet steering stability performance | | 105 | 100 | 106 | 103 |
| Low rolling resistance performance | | 100 | 100 | 102 | 105 |

FIG. 6b

| | | Working Example 7 | Working Example 8 | Working Example 9 | Working Example 10 |
|---|---|---|---|---|---|
| Earthing tread contact surface | | Belt layer outer circumferential surface | Belt layer outer circumferential surface | Belt layer outer circumferential surface | Belt layer outer circumferential surface |
| Widened portion of earthing tread | | Yes | Yes | Yes | Yes |
| Undertread thickened portion | | Yes | Yes | Yes | Yes |
| W1 | mm | 3.0 | 2.0 | 1.0 | 1.0 |
| W2 | mm | 5.0 | 3.0 | 2.0 | 2.0 |
| G1 | mm | 1.5 | 1.5 | 1.5 | 1.5 |
| G2 | mm | 4.5 | 1.5 | 2.5 | 2.5 |
| G2/G1 | | 3.0 | 1.0 | 1.7 | 1.7 |
| Contact length between earthing tread and belt layer and undertread | mm | 14.0 | 6.0 | 7.0 | 7.0 |
| tan δ ut | | 0.20 | 0.10 | 0.10 | 0.10 |
| α | ° | 70 | 70 | 60 | 80 |
| D2/D1 | | 0.2 | 0.2 | 0.2 | 0.2 |
| Cap tread resistivity | Ω·cm | $1\times10^{13}$ | $1\times10^{13}$ | $1\times10^{13}$ | $1\times10^{13}$ |
| Undertread resistivity | Ω·cm | $1\times10^{8}$ | $1\times10^{8}$ | $1\times10^{8}$ | $1\times10^{8}$ |
| Belt layer coating rubber resistivity | Ω·cm | $1\times10^{5}$ | $1\times10^{5}$ | $1\times10^{5}$ | $1\times10^{5}$ |
| Carcass layer coating rubber resistivity | Ω·cm | $1\times10^{5}$ | $1\times10^{5}$ | $1\times10^{5}$ | $1\times10^{5}$ |
| Rim cushion rubber resistivity | Ω·cm | $1\times10^{5}$ | $1\times10^{5}$ | $1\times10^{5}$ | $1\times10^{5}$ |
| Wing tip resistivity | Ω·cm | $1\times10^{9}$ | $1\times10^{9}$ | $1\times10^{9}$ | $1\times10^{9}$ |
| Electrical resistance value | Ω | $7\times10^{5}$ | $9\times10^{6}$ | $8\times10^{6}$ | $1\times10^{6}$ |
| Separation resistance performance | | 100 | 105 | 105 | 105 |
| Dry/wet steering stability performance | | 97 | 105 | 107 | 107 |
| Low rolling resistance performance | | 107 | 105 | 103 | 105 |

FIG. 6c

| | | Working Example 11 | Working Example 12 | Working Example 13 |
|---|---|---|---|---|
| Earthing tread contact surface | | Belt layer outer circumferential surface | Belt layer outer circumferential surface | Belt layer outer circumferential surface |
| Widened portion of earthing tread | | Yes | Yes | Yes |
| Undertread thickened portion | | Yes | Yes | Yes |
| W1 | mm | 1.0 | 1.0 | 1.0 |
| W2 | mm | 2.0 | 2.0 | 2.0 |
| G1 | mm | 1.5 | 1.5 | 1.5 |
| G2 | mm | 2.5 | 2.5 | 2.5 |
| G2/G1 | | 1.7 | 1.7 | 1.7 |
| Contact length between earthing tread and belt layer and undertread | mm | 7.0 | 7.0 | 7.0 |
| tan δ ut | | 0.10 | 0.10 | 0.10 |
| α | ° | 70 | 70 | 70 |
| D2/D1 | | 0.1 | 0.3 | 0.2 |
| Cap tread resistivity | Ω·cm | $1\times10^{13}$ | $1\times10^{13}$ | $1\times10^{10}$ |
| Undertread resistivity | Ω·cm | $1\times10^{8}$ | $1\times10^{8}$ | $1\times10^{8}$ |
| Belt layer coating rubber resistivity | Ω·cm | $1\times10^{5}$ | $1\times10^{5}$ | $1\times10^{5}$ |
| Carcass layer coating rubber resistivity | Ω·cm | $1\times10^{5}$ | $1\times10^{5}$ | $1\times10^{5}$ |
| Rim cushion rubber resistivity | Ω·cm | $1\times10^{5}$ | $1\times10^{5}$ | $1\times10^{5}$ |
| Wing tip resistivity | Ω·cm | $1\times10^{9}$ | $1\times10^{9}$ | $1\times10^{9}$ |
| Electrical resistance value | Ω | $9\times10^{6}$ | $4\times10^{6}$ | $3\times10^{6}$ |
| Separation resistance performance | | 105 | 105 | 105 |
| Dry/wet steering stability performance | | 107 | 107 | 105 |
| Low rolling resistance performance | | 103 | 105 | 105 |

FIG. 6d

|  |  | Working Example 14 | Working Example 15 | Working Example 16 |
|---|---|---|---|---|
| Earthing tread contact surface |  | Belt layer outer circumferential surface | Belt layer outer circumferential surface | Belt layer outer circumferential surface |
| Widened portion of earthing tread |  | Yes | Yes | Yes |
| Undertread thickened portion |  | Yes | Yes | Yes |
| W1 | mm | 1.0 | 1.0 | 1.0 |
| W2 | mm | 2.0 | 2.0 | 2.0 |
| G1 | mm | 1.5 | 1.5 | 1.5 |
| G2 | mm | 2.5 | 2.5 | 2.5 |
| G2/G1 |  | 1.7 | 1.7 | 1.7 |
| Contact length between earthing tread and belt layer and undertread | mm | 7.0 | 7.0 | 7.0 |
| tan δ ut |  | 0.10 | 0.10 | 0.10 |
| α | ° | 70 | 70 | 70 |
| D2/D1 |  | 0.2 | 0.2 | 0.2 |
| Cap tread resistivity | Ω·cm | 1×10^13 | 1×10^13 | 1×10^13 |
| Undertread resistivity | Ω·cm | 1×10^10 | 1×10^8 | 1×10^8 |
| Belt layer coating rubber resistivity | Ω·cm | 1×10^5 | 1×10^7 | 1×10^6 |
| Carcass layer coating rubber resistivity | Ω·cm | 1×10^5 | 1×10^7 | 1×10^6 |
| Rim cushion rubber resistivity | Ω·cm | 1×10^5 | 1×10^7 | 1×10^6 |
| Wing tip resistivity | Ω·cm | 1×10^9 | 1×10^9 | 1×10^8 |
| Electrical resistance value | Ω | 4×10^6 | 3×10^6 | 4×10^6 |
| Separation resistance performance |  | 107 | 105 | 105 |
| Dry/wet steering stability performance |  | 107 | 112 | 110 |
| Low rolling resistance performance |  | 110 | 107 | 105 |

FIG. 6e

PNEUMATIC TIRE HAVING SPECIFIED GROUNDING TREAD

TECHNICAL FIELD

The present technology relates to a pneumatic tire, and in particular to a pneumatic tire that can improve electrostatic suppression performance.

BACKGROUND

An electrostatic prevention structure using a grounding tread to discharge static electricity generated during vehicle travel through a pneumatic tire to a road surface is known in the art. In this electrostatic prevention structure, the grounding tread is exposed to a road contact surface of a tread rubber and is disposed so as to penetrate a cap tread and an undertread to contact a belt layer in an electrically conductive manner. As a result, static electricity from the vehicle side is discharged from the belt layer through the grounding tread to the road surface so that electrification of the vehicle is prevented. The technologies described in Japanese Patent No. 3287795 and Japanese Patent No. 3763640 are conventional pneumatic tires using such a configuration.

SUMMARY

The present technology provides a pneumatic tire that can improve electrostatic suppression performance. A pneumatic tire according to the present technology comprises: a carcass layer; a belt layer; a tread rubber including a cap tread and an undertread; a pair of side wall rubbers; a pair of rim cushion rubbers; and a grounding tread that is exposed to a road contact surface of a tread rubber and penetrates the cap tread and the undertread to contact the belt layer in an electrically conductive manner. In such a pneumatic tire, the grounding tread includes a widened portion having a cross-sectional area that widens toward a contact surface of the belt layer at a contact portion with the belt layer, and the widened portion of the grounding tread has a profile shape that bulges outward in a tire width direction.

In the pneumatic tire according to the present technology, the contact surface of the grounding tread and the belt layer is increased and the contact state between the grounding tread and the belt layer can be reliably secured due to the provision of the widened portion in the grounding tread at the contact portion with the belt layer. Consequently, there is an advantage that conductivity from the belt layer to the grounding tread is improved and the electrostatic suppression performance of the tire is improved.

BRIEF DESCRIPTION OF THE DRAWINGS

FIGS. 6a-6e include a table showing results of performance testing of pneumatic tires according to embodiments of the present technology.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, the multiple modified examples described in the embodiment can be combined as desired within the scope apparent to a person skilled in the art.

Pneumatic Tire

Figure 1:
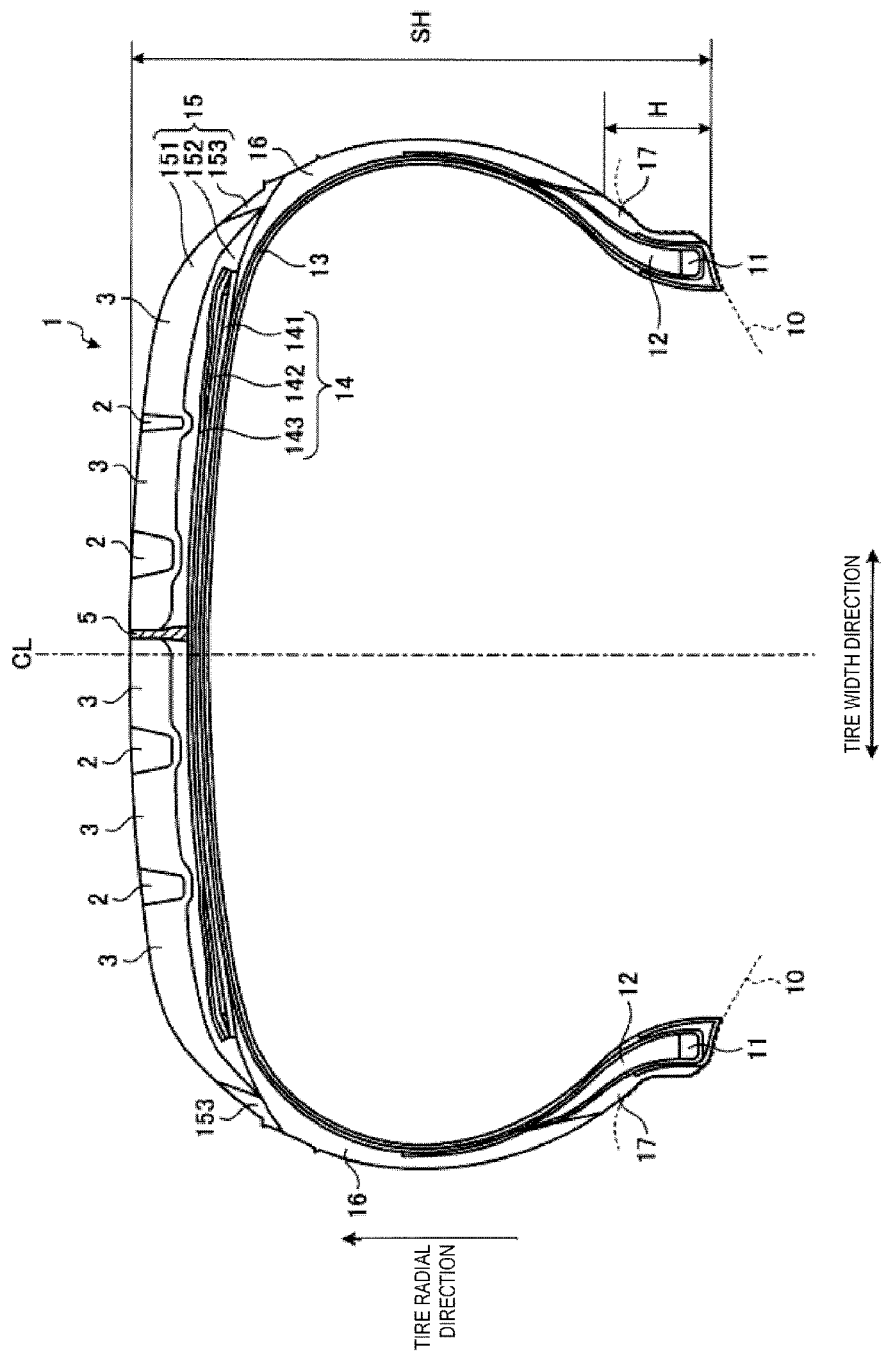
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. FIG. 1 illustrates a region of one side in a tire radial direction. This drawing illustrates a radial tire for use on a passenger car as an example of the pneumatic tire. Note that the symbol CL refers to a tire equatorial plane. A tire width direction refers to a direction parallel to a tire rotational axis (not illustrated), and the tire radial direction refers to the direction perpendicular to the tire rotational axis.

The pneumatic tire 1 has an annular structure centered around the tire rotational axis, and includes a pair of bead cores 11,11, a pair of bead fillers 12,12, a carcass layer 13, a belt layer 14, a tread rubber 15, a pair of side wall rubbers 16,16, and a pair of rim cushion rubbers 17,17 (see FIG. 1).

The pair of bead cores 11,11 have annular structures and constitute cores of left and right bead portions. The pair of bead fillers 12,12 is disposed on a periphery of each of the pair of bead cores 11,11 in the tire radial direction so as to reinforce the bead portions.

The carcass layer 13 stretches between the left and right side bead cores 11 and 11 in toroidal form, forming a framework for the tire. Additionally, both ends of the carcass layer 13 are folded toward an outer side in the tire width direction so as to envelop the bead cores 11 and the bead fillers 12, and fixed. The carcass layer 13 is constituted by a plurality of carcass cords formed from steel or organic fibers (e.g., aramid, nylon, polyester, rayon or the like), covered by a coating rubber, and subjected to a rolling process, having a carcass angle (inclination angle of the carcass cord in a fiber direction with respect to a tire circumferential direction), as an absolute value, of not less than 80° and not more than 95°. While the carcass layer 13 has a single-layer structure formed from a single carcass ply in the configuration in FIG. 1, the carcass layer 13 is not limited as such and may have a multi-layer structure in which the carcass layer 13 is formed by laminating a plurality of carcass plies.

The belt layer 14 is formed by laminating a pair of cross belts 141,142, and a belt cover 143, disposed on the periphery of the carcass layer 13. The pair of cross belts 141 and 142 are constituted by a plurality of belt cords formed from steel or organic fibers, covered by a coating rubber, and subjected to a rolling process, having a belt angle, as an absolute value, of not less than 20° and not more than 40°. Further, each of the belts of the pair of cross belts 141 and 142 has a belt angle (inclination angle in the fiber direction of the belt cord with respect to the tire circumferential direction) denoted with a mutually different symbol, and the belts are stacked so as to intersect each other in the belt cord fiber directions (crossply configuration). The belt cover 143 is constituted by a plurality of belt cords formed from steel or organic fibers, covered by a coating rubber, and subjected to a rolling process, having a belt angle, as an absolute value, of not less than −10° and not more than 10°. Also, the belt cover 143 is disposed so as to be laminated outward in the tire radial direction of the cross belts 141, 142.

The tread rubber 15 is disposed on an outer circumference in the tire radial direction of the carcass layer 13 and the belt layer 14, and forms a tread portion of the tire. The tread rubber 15 includes a cap tread 151, an undertread 152, and left and right wing tips 153, 153. The cap tread 151 has a tread pattern and constitutes exposed portions (tread road contact surface, etc.) of the tread rubber 15. The undertread 152 is disposed between the cap tread 151 and the belt layer 14, and constitutes a base portion of the tread rubber 15. The wing tips 153 are each disposed at left and right ends of the cap tread 151 in the tire width direction, and constitute a portion of a buttress portion.

For example, the cap tread 151 is laminated to cover the entire undertread 152 with the undertread 152 interposed between the cap tread 151 and the belt layer 14 as illustrated in FIG. 1. The wing tips 153, 153 are each disposed on boundary portions of the left and right ends of the cap tread 151 and the left and right side wall rubbers 16, 16, and are exposed to the top surface of the buttress portion.

The pair of side wall rubbers 16,16 is disposed on each outer side of the carcass layer 13 in the tire width direction, so as to form left and right side wall portions of the tire. For example, the end portions of the side wall rubbers 16 outward in the tire radial direction are inserted under the tread rubber 15 to be interposed between the tread rubber 15 and the carcass layer 13 as illustrated in FIG. 1.

The pair of rim cushion rubbers 17 and 17 is disposed on each outer side of the left and right bead cores 11 and 11 and the bead fillers 12 and 12 in the tire width direction so as to form left and right bead portions of the tire. For example, end portions of the rim cushion rubbers 17 outward in the tire radial direction are inserted under the side wall rubbers 16 to be interposed between the side wall rubbers 16 and the carcass layer 13 as illustrated in FIG. 1.

Figure 2:
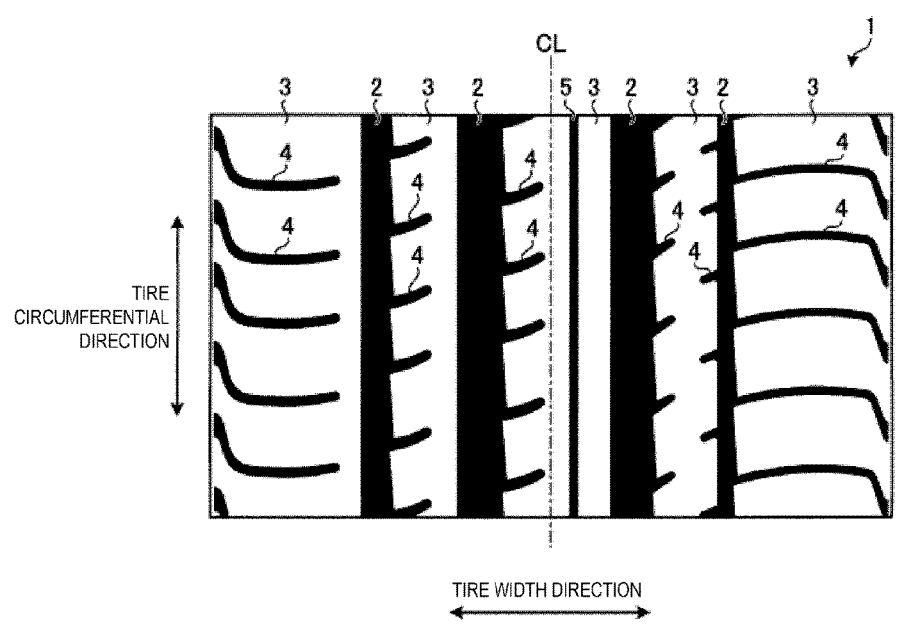
FIG. 2 is a plan view illustrating a tread surface of the pneumatic tire depicted in FIG. 1.

FIG. 2 is a plan view illustrating a tread surface of the pneumatic tire depicted in FIG. 1. This drawing illustrates a tread pattern of a summer tire. The tire circumferential direction is the direction around the tire rotational axis.

The pneumatic tire 1 includes a plurality of circumferential main grooves 2 extending in the tire circumferential direction, a plurality of land portions 3 partitioned by the circumferential main grooves 2, and a plurality of lug grooves 4 disposed in the land portions 3 (see FIG. 2). For example, five rows of the land portions 3 are partitioned by four circumferential main grooves 2 in the configuration illustrated in FIG. 2. Moreover, the land portions 3 each have penetrating or non-penetrating lug grooves 4.

Note that "circumferential main grooves 2" refers to circumferential grooves having a groove width of 4.0 mm or greater. The groove widths of the circumferential main grooves 2 are measured excluding notched portions and/or chamfered portions formed at the groove opening portion.

(Electrostatic Prevention Structure Using Grounding Tread)

An electrostatic prevention structure using a grounding tread to discharge static electricity generated during vehicle travel through a pneumatic tire to the road surface is known in the art. The grounding tread is exposed to the road contact surface of the tread rubber and is disposed to penetrate the cap tread and the undertread to contact the belt layer in an electrically conductive manner in the electrostatic prevention structure. As a result, static electricity from the vehicle side is discharged from the belt layer through the grounding tread to the road surface so that electrification of the vehicle is prevented.

The silica content of rubber compounds constituting the cap tread has been increasing recently in order to improve the dry performance and wet performance of tires. However, since silica has high insulation characteristics, the resistance value of the cap tread has increased with the increase in the silica content of the cap tread, thus reducing the electrostatic suppression performance of the tire.

Accordingly, this pneumatic tire uses the following configuration to improve tire electrostatic suppression performance.

Figure 3:
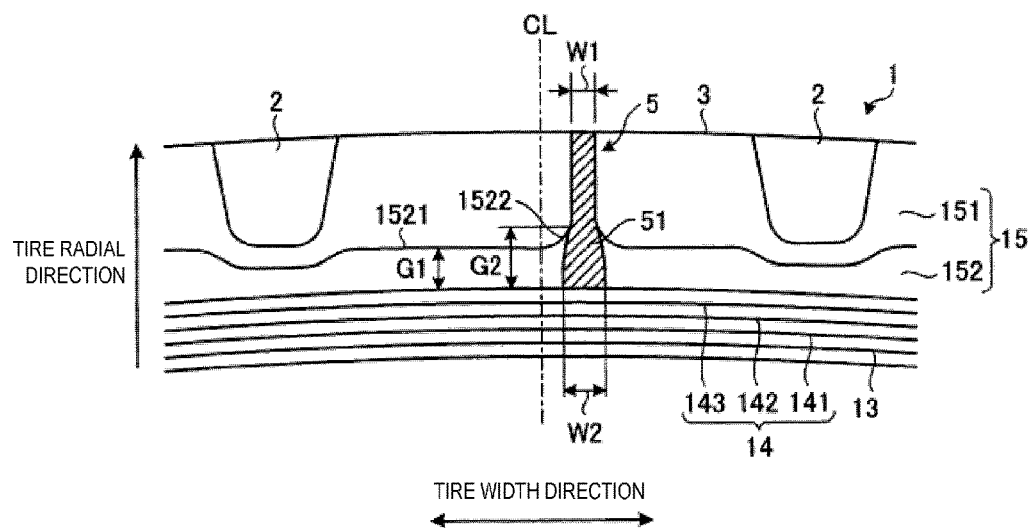
FIG. 3 is an explanatory view illustrating an electrostatic prevention structure of the pneumatic tire depicted in FIG. 1.
Figure 4:
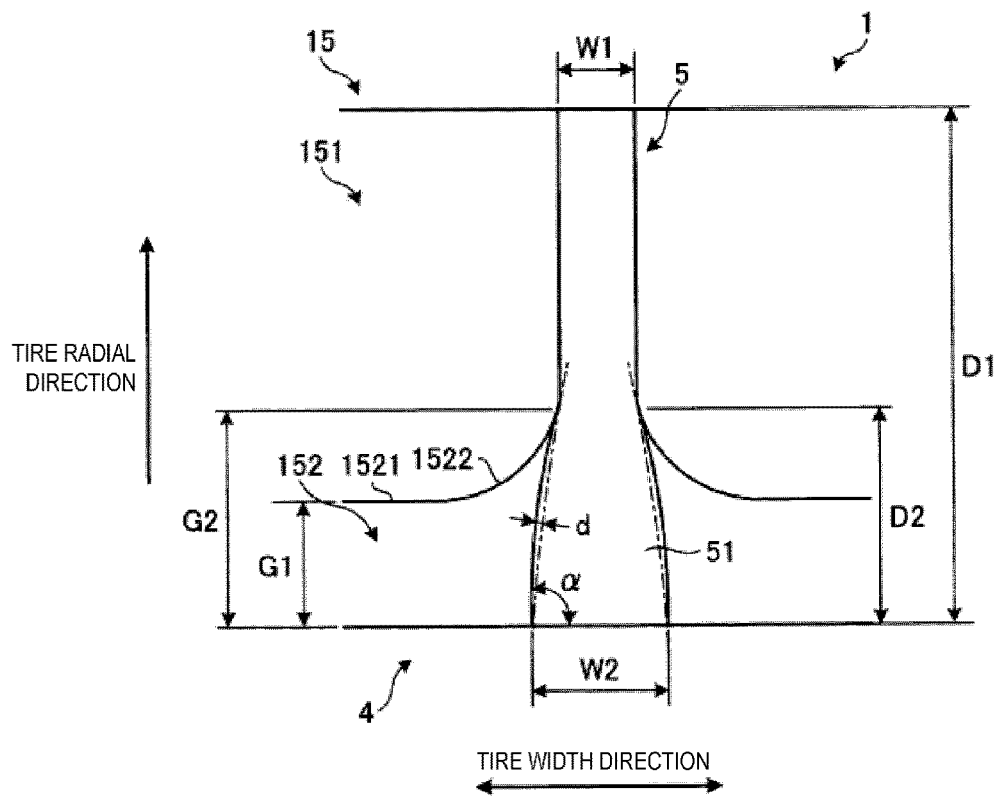
FIG. 4 is an explanatory view illustrating the electrostatic prevention structure of the pneumatic tire depicted in FIG. 1.
Figure 5:
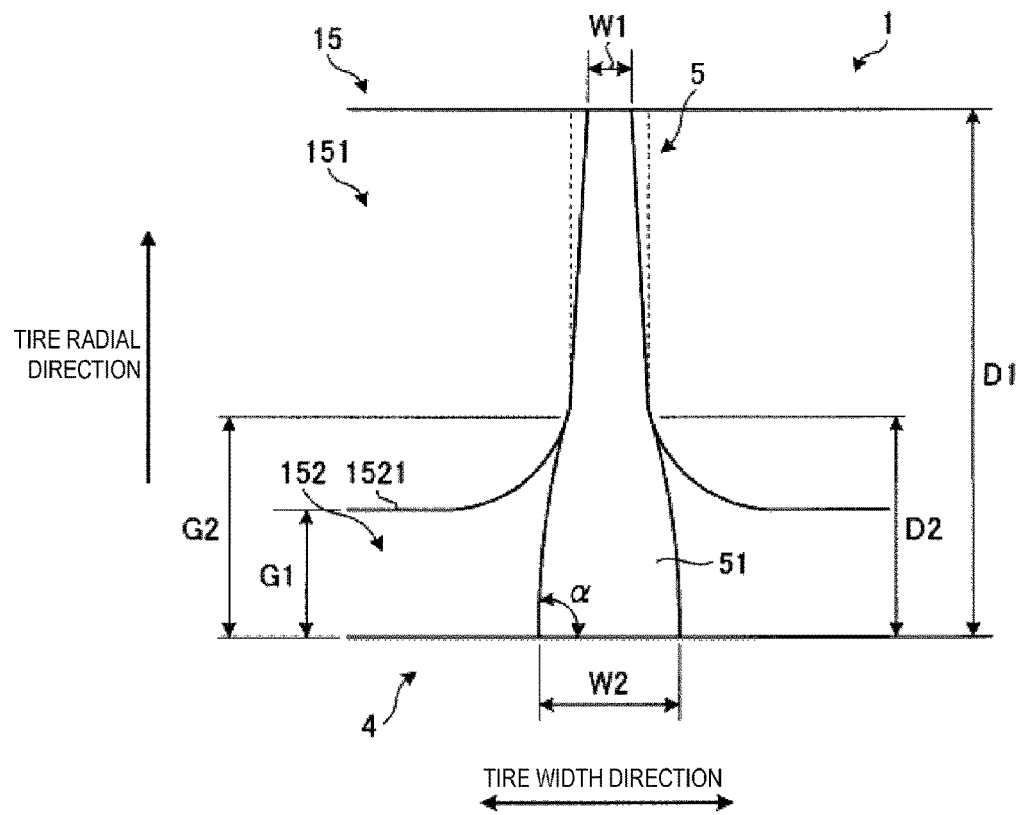
FIG. 5 is an explanatory view illustrating a modified example of the grounding tread depicted in FIG. 4.

FIGS. 3 and 4 are explanatory views illustrating the electrostatic prevention structure of the pneumatic tire depicted in FIG. 1. FIG. 5 is an explanatory view illustrating a modified example of the grounding tread depicted in FIG. 4. Among these drawings, FIG. 3 is an enlargement of the cross-sectional view in the tire meridian direction at the disposition location of the grounding tread 5, and FIGS. 4 and 5 schematically illustrate the disposition structure of the grounding tread 5 and the surrounding members.

As described above, the pneumatic tire 1 includes the grounding tread 5 that is exposed to the road contact surface of the tread rubber 15, and that penetrates the cap tread 151 and the undertread 152 to contact the belt layer 14 in an electrically conductive manner.

The grounding tread 5 is formed from conductive rubber material having a resistivity less than that of the tread rubber 15, or more specifically, has a resistivity of not more than $1 \times 10^{\wedge}6$ Ω·cm. The grounding tread 5 is formed by compounding not less than 40 parts by weight, or preferably from 45 to 70 parts by weight, of carbon black in 100 parts by weight of a diene rubber base material. Further, an antistatic agent, a conductive plasticizer, or a conducting agent such as a metal salt and the like may be added to improve conductivity.

Resistivity is calculated on the basis of the resistance value between the tread road contact surface and the rim when applying a voltage of 1000 V under the conditions of an ambient temperature of from 15° C. to 30° C. and a humidity of not more than 60%.

The grounding tread 5 includes a widened portion 51 having a cross-sectional area that widens toward a contact surface with the belt layer 14 at a contact portion with the belt layer 14. As a result, in comparison to a configuration in which a grounding tread 5 has a straight shape with a fixed width in the base portion, the contact surface area between the grounding tread 5 and the belt layer 14 is increased, the contact state between the grounding tread 5 and the belt layer 14 is reliably secured, and the conductivity from the belt layer 14 to the grounding tread 5 is improved.

The contact between the grounding tread 5 and the belt layer 14 refers to a contact between the grounding tread 5 and the coating rubber of the outermost belt ply (the belt cover 143 in FIG. 3.) of the belt layer 14.

For example, the grounding tread 5 in the configuration in FIGS. 3 and 4 has a straight shape with a fixed width in the penetrating portion that penetrates the cap tread 151 when seen as a cross-section in the tire meridian direction, and gradually widens in the penetrating portion that penetrates the undertread 152 toward the belt layer 14 and contacts the outer circumferential surface (circumferential surface outward in the tire radial direction) of the belt layer 14. Since the contact surface of the undertread 152 with the belt layer 14 has a planar shape, the undertread 152 and the belt layer 14 form a surface contact to desirably secure the contact surface area and the contact state of both members.

As illustrated in FIGS. 3 and 4, a width W1 at the tread road contact surface of the grounding tread 5 and a width W2 at the contact surface with the belt layer 14 have a relationship of W1<W2. The width W1 and the width W2 of the grounding tread 5 are preferably such that 0.5 mm≤W1≤2.0 mm and 1.0 mm≤W2≤3.0 mm. Consequently, conductivity from the contact surface of the grounding tread 5 with the belt layer 14 to the tread road contact surface is appropriately secured. The width W1 is measured as a distance in the tire width direction of the exposed portion at the tread road contact surface of the grounding tread 5 when seen as a cross-section in the tire meridian direction. The width W2 is measured as a distance in the tire width direction of the contact surface between the grounding tread 5 and the belt layer 14 when seen as a cross-section in the tire meridian direction.

As illustrated in FIG. 4, the widened portion 51 of the grounding tread 5 has a parabolic profile shape that bulges outward in the tire width direction. Specifically, the widened portion 51 of the grounding tread 5 has a shape in which the right and left side portions bulge in the tire width direction while widening toward the contact surface with the belt layer 14. As a result, the cross-sectional shape of the widened portion 51 is made appropriate at the contact surface between the grounding tread 5 and the belt layer 14.

A bulging amount d of the widened portion 51 is preferably such that 0.2 mm≤d≤1.0 mm. Consequently, the bulging amount d of the widened portion 51 is made appropriate. The bulging amount d of the widened portion 51 is measured as the maximum bulging amount based on a virtual line drawn from a point where the widened portion 51 starts widening toward the contact surface with the belt layer 14 to a point at an end of the contact surface between the widened portion 51 and the belt layer 14 when seen as a cross-section in the tire meridian direction.

A base angle α of the widened portion 51 is preferably such that 60°≤α≤80°. For example, since D2 becomes smaller if α is less than 60°, the region (cross-sectional area) of the widened portion 51 is reduced and a reduction effect of the electrical resistance becomes undesirably smaller. If α is greater than 80°, the cross-sectional area of the cap tread 151 is reduced thus undesirably reducing steering stability (if the width W2 is assumed to be fixed). The base angle α of the widened portion 51 is measured as the angle that is formed between the side surface of the widened portion 51 and the belt layer 14 at the contact surface between the grounding tread 5 and the belt layer 14 when seen as a cross-section in the tire meridian direction.

As illustrated in FIG. 4, a height D1 of the entire grounding tread 5 and a height D2 of the widened portion 51 of the grounding tread 5 preferably have a relationship of 0.1≤D2/D1≤0.3. For example, if the region (cross-sectional area) of the widened portion 51 becomes smaller if D2/D1 is less than 0.1, a reduction effect of the electrical resistance becomes undesirably smaller. If D2/D1 is greater than 0.3, the cross-sectional area of the grounding compound of the tread center portion becomes too large (cap compound is reduced), and the dry steering stability performance and the wet steering stability performance of the tire are undesirably reduced. The height D1 of the entire earthing tread 5 is measured as the distance from the exposed surface at the tread road contact surface of the grounding tread 5 to the contact surface with the belt layer 14. The height D2 of the widened portion 51 is measured as the distance from the starting point of the profile shape of the grounding tread 5 that bulges outward in the tire width direction to the contact surface with the belt layer 14.

As illustrated in FIG. 2, the grounding tread 5 has an annular structure that extends along the entire circumference of the tire. For example, the grounding tread 5 is disposed in the center portion of the land portion 3 at the tire equatorial plane CL and in the rib-like land portion 3 that continues in the tire circumferential direction in the configuration in FIG. 2. A portion of the grounding tread 5 is exposed to the tread road contact surface while extending continuously in the tire circumferential direction. As a result, the exposed portion of the grounding tread 5 is configured to be in constant contact with the road surface while the tire makes ground contact.

The grounding tread 5 and the lug grooves 4 or sipes (not illustrated) on the tread surface may be disposed so as to intersect in the above configuration. An electrically conductive path through the grounding tread 5 is appropriately secured even if the grounding tread 5 is partially divided in this way in the tire circumferential direction by the lug grooves 4 or the sipes.

The grounding tread 5 has a straight shape with a fixed width in the portion closer to the tread road contact surface side than the widened portion 51 in the configuration of FIGS. 3 and 4. However, the shape of the grounding tread 5 is not limited as such, and may have a shape in which the width narrows from the widened portion 51 toward the tread road contact surface as illustrated in FIG. 5. In this case, the conductivity of the grounding tread 5 is appropriately secured by maintaining a width W1 at the tread road contact surface of the grounding tread 5 such that 0.5 mm≤W1≤2.0 mm as described above.

The cap tread 151 of the pneumatic tire 1 has a resistivity of not less than $1\times10^{10}$ Ω·cm. That is, the above grounding tread 5 is preferably applied when the cap tread 151 has such a high resistivity.

An insulating rubber material in which not less than 65 parts by weight of silica is compounded in 100 parts by weight of a rubber base material is used in the cap tread 151. The insulating rubber material also includes not more than 30 parts by weight of carbon black, or preferably includes not more than 10 parts by weight of carbon black, or more preferably substantially includes no carbon black. The rubber base material may be formed by one type or a combination of a plurality of types of diene rubbers such as natural rubber (NR), styrene-butadiene rubber (SBR), butadiene rubber (BR), isoprene rubber (IR) and the like. Further, conventional additives such as sulfur, a vulcanization accelerator, an antiaging agent, and the like may be added.

The undertread 152 of the pneumatic tire 1 has a resistivity of not more than $1\times10^{10}$ Ω·cm. That is, an electrically conductive path from the belt layer 14 to the grounding tread 5 through the undertread 152 is secured by the undertread 152 having such a low resistivity. In this case, especially since the widened portion 51 of the grounding tread 5 has a profile shape that bulges outward in the tire width direction, the contact surface area between the undertread 152 and the grounding tread 5 is increased and conductive efficiency from the undertread 152 to the grounding tread 5 is improved in comparison to a configuration (not illustrated) in which the undertread has a straight shape.

The loss tangent tan δ_ut of the undertread 152 is such that tan δ_ut≤0.15. The loss tangent tan δ_ut of the undertread 152 and the loss tangent tan δ_et of the grounding tread 5 have a relationship of tan δ_ut<tan δ_et. In this way, separation at the contact surface between the grounding tread 5 and the belt layer 14 can be suppressed by using the reduced heat build-up of the undertread 152 and setting the loss tangent tan δ_ut of the undertread 152 to be lower than the loss tangent tan δ_et of the grounding tread 5.

As illustrated in FIGS. 3 and 4, the undertread 152 has a thickened portion 1522 in which a gauge is increased toward the contact surface with the grounding tread 5 at the penetrating portion of the grounding tread 5. Consequently, the contact surface area between the undertread 152 and the grounding tread 5 is increased and conductive efficiency from the undertread 152 to the grounding tread 5 is improved.

Specifically, a gauge G1 of a flat portion 1521 and a gauge G2 of the thickened portion 1522 of the undertread 152 has a relationship of G1<G2. The gauge G1 and the gauge G2 of the undertread 152 preferably have a relationship of $1.5 \leq G2/G1 \leq 2.5$.

The gauge G1 of the flat portion 1521 is measured among the gauges of the undertread 152 below the land portion 3 having the grounding tread 5 as an average gauge of regions excluding localized uneven portions such as (a) portions in which the gauge increases near the penetrating portion of the grounding tread 5 due to the thickened portion 1522, and (b) portions in which the undertread 152 is pressed by the mold dies of the circumferential main groove 2 so that the gauge decreases as illustrated in FIG. 3.

The gauge G2 of the thickened portion 1522 is measured at the contact surface between the undertread 152 and the grounding tread 5 as illustrated in FIGS. 3 and 4. As the gage G2 of the thickened portion 1522 increases, the contact surface between the undertread 152 and the grounding tread 5 becomes correspondingly wider, and the conductive efficiency from the undertread 152 to the grounding tread 5 is improved.

For example, in the configuration in FIG. 3, the grounding tread 5 is disposed in the land portion 3 on the tire equatorial plane CL partitioned by left and right circumferential main grooves 2, 2, and penetrates the cap tread 151 and the undertread 152 in the tire radial direction from the tread road contact surface to make a surface contact with the belt layer 14. In this case, as illustrated in FIG. 4, the height D2 of the widened portion 51 of the grounding tread 5 and the gauge G2 of the thickened portion 1522 have substantially the same dimension. Substantially the entire widened portion 51 of the grounding tread 5 is embedded in the undertread 152 and makes a surface contact with the undertread 152. Consequently, the contact surface area between the undertread 152 and the grounding tread 5 is increased.

In the configuration illustrated in FIGS. 3 and 4, the gauge of the thickened portion 1522 of the undertread 152 increases gradually from the flat portion 1521 on the circumferential main groove 2 side toward the contact surface with the grounding tread 5. The thickened portion 1522 of the undertread 152 has a parabolic curved shape that bulges toward the contact surface side with the grounding tread 5 at the contact surface with the cap tread 151. Consequently, the gauge of the cap tread 151 is secured and the contact surface area between the undertread 152 and the grounding tread 5 is effectively increased.

In the pneumatic tire 1, the resistivity of the coating rubber of the carcass layer 13, the resistivity of the coating rubber of the belt plies 141 to 143 of the belt layer 14, and the resistivity of the rim cushion rubber 17 are each preferably no more than $1 \times 10^7$ Ω·cm.

Static electricity generated in the vehicle is discharged from the rim 10 through the rim cushion rubber 17, the carcass layer 13, the belt layer 14 (and the undertread 152), and then from the grounding tread 5 to the road surface. Therefore, the coating rubbers of the rim cushion rubber 17, the carcass layer 13, and the belt layer 14 are preferably set with a low resistivity to establish the electrically conductive path from the rim 10 to the grounding tread 5. Accordingly, conductive efficiency from the rim 10 to the grounding tread 5 is improved by maintaining the resistivity of the aforementioned coating rubbers within the above range.

In the pneumatic tire 1, the wing tips 153 preferably have a resistivity of not less than $1 \times 10^8$ Ω·cm. As a result, the stiffness of the wing tips 153 can be secured and the wet performance of the tire can be secured.

While the lower limit of the resistivities of the grounding tread 5, the undertread 152, the coating rubber of the belt layer 14, the coating rubber of the carcass layer 13, and the coating rubber of the rim cushion rubber 17, and the upper limit of the resistivities of the cap tread 151 and the wing tips 153 are not limited in particular, the aforementioned components have physical constraints due to being rubber members.

In the pneumatic tire 1, the resistivity of the rim cushion rubber 17 is not more than $1 \times 10^7$ Ω·cm, and as illustrated in FIG. 1, a cross-section height H from the side edge portion of the rim cushion rubber 17 and the tire cross-section height SH preferably have a relationship of $0.20 \leq H/SH$. As a result, contact between the rim cushion rubber 17 having the low resistivity and the rim 10 is appropriately secured.

The tire cross-section height SH refers to ½ of the difference between the tire outer diameter and the rim diameter. The cross-section height H of the rim cushion rubber 17 refers to a distance from the rim diameter measurement point to the edge portion on the outermost side in the tire radial direction of the exposed portion of the rim cushion rubber 17 on the tire side surface.

Effect

As described above, the pneumatic tire 1 includes the carcass layer 13, the belt layer 14, the tread rubber 15 having the cap tread 151 and the undertread 152, the pair of side wall rubbers 16,16, the pair of rim cushion rubbers 17,17, and the grounding tread 5 that is exposed to the road contact surface of the tread rubber 15 and that penetrates the cap tread 151 and the undertread 152 to contact the belt layer 14 in an electrically conductive manner (see FIG. 1). The grounding tread 5 includes the widened portion 51 having a cross-sectional area that widens toward the contact surface with the belt layer 14 at the contact portion with the belt layer 14. The widened portion 51 of the grounding tread 5 has a profile shape that bulges outward in the tire width direction (see FIGS. 3 and 4).

In such a configuration, (1) due to the grounding tread 5 having the widened portion 51 at the contact portion with the belt layer 14, the contact surface area between the grounding tread 5 and the belt layer 14 is increased in comparison to a configuration (not illustrated) in which a grounding tread has a straight shape with a fixed width, and thus the contact state between the grounding tread 5 and the belt layer 14 is reliably secured. Consequently, there is an advantage that conductivity from the belt layer 14 to the grounding tread 5 is improved and the electrostatic suppression performance of the tire is improved. Furthermore, there is an advantage that separation of the undertread 152 at the contact portion between the grounding tread 5 and the belt layer 14 is effectively suppressed due to the grounding tread 5 having a shape in which the cross-sectional area widens toward the contact portion with the belt layer 14.

Moreover, (2) since the widened portion 51 of the grounding tread 5 has a profile shape that bulges outward in the tire width direction with such a configuration, the widened portion 51 of the grounding tread 5 projects and swells in the tire width direction to establish a wider width toward the contact surface with the belt layer 14. As a result, there is an advantage that an electrical resistance value can be effectively reduced in comparison to a configuration (not illustrated) in which a grounding tread has a trumpet-like tubular cross-sectional shape (a cross-sectional shape smoothly abutting the belt layer 14 due to curved lines such as an arc) that is recessed in the tire width direction.

In the pneumatic tire 1, the cap tread 151 has a resistivity of not less than $1 \times 10^{10}$ Ω·cm and the grounding tread 5 has a resistivity of not more than $1 \times 10^{6}$ Ω·cm (see FIG. 3). There is an advantage with such a configuration that an improvement in electrostatic suppression performance of the tire is noticeably achieved due to the grounding tread 5 since the grounding tread 5 having a low resistivity is applied to the configuration including the cap tread 151 having a high resistivity.

In the pneumatic tire 1, the undertread 152 has the thickened portion 1522 in which the gauge is increased toward the contact surface with the grounding tread 5 at a penetrating portion of the grounding tread 5 (see FIGS. 3 and 4). With such a configuration, the contact surface between the undertread 152 and the grounding tread 5 is increased in comparison to a configuration (not illustrated) with an undertread having a homogeneous thickness since the undertread 152 has the thickened portion 1522 in the penetrating portion of the grounding tread 5. Consequently, there is an advantage that conductivity of an energizing path from the belt layer 14 through the undertread 152 to the grounding tread 5 is improved and the electrostatic suppression performance of the tire is improved.

In the pneumatic tire 1, the undertread 152 has a resistivity of not more than $1 \times 10^{10}$ Ω·cm (see FIG. 3). There is an advantage with such a configuration that the conductivity of the energizing path from the belt layer 14 through the undertread 152 to the grounding tread 5 is improved due to the use of the undertread 152 having such a low resistivity.

In the pneumatic tire 1, the width W1 at the tread road contact surface of the grounding tread 5 and the width W2 at the contact surface with the belt layer 14 have a relationship of W1<W2 (see FIG. 3). As a result, there is an advantage that the conductivity of the grounding tread 5 is appropriately secured.

In the pneumatic tire 1, the width W1 and the width W2 of the grounding tread 5 are such that 0.5 mm≤W1≤2.0 mm and 1.0 mm≤W2≤3.0 mm (see FIG. 3). As a result, there is an advantage that the conductivity of the grounding tread 5 is appropriately secured. For example, if W1 is less than 0.5 mm, the conductivity of the grounding tread 5 is reduced. If W1 is greater than 0.2 mm, the ground contact area of the cap tread 151 becomes smaller and the dry performance and the wet performance of the tire are undesirably reduced.

In the pneumatic tire 1, the gauge G1 of the flat portion 1521 and the gauge G2 of the thickened portion 1522 of the undertread 152 has a relationship of G1<G2 (see FIG. 3). Consequently, there is an advantage that the contact surface area between the undertread 152 and the grounding tread 5 is increased and the conductivity of the energizing path from the belt layer 14 through the undertread 152 to the grounding tread 5 is improved.

In the pneumatic tire 1, the gauge G1 and the gauge G2 of the undertread 152 have a relationship of 1.5≤G2/G1≤2.5 (see FIG. 3). Consequently, there is an advantage that conductivity of the energizing path from the belt layer 14 through the undertread 152 to the grounding tread 5 is improved. For example, if G1/G2 is less than 1.5, the conductivity from the undertread 152 to the grounding tread 5 is undesirably reduced. If G2/G1 is greater than 2.5, the thickness of the gauge G1 of the undertread 152 becomes too thick and the steering stability performance of the tire is undesirably reduced.

In the pneumatic tire 1, the loss tangent tan δ_ut of the undertread 152 and the loss tangent tan δ_et of the grounding tread 5 satisfy conditions tan δ_ut≤0.15 and tan δ_ut<tan δ_et.

In the pneumatic tire 1, the grounding tread 5 extends along the entire tire circumference (see FIG. 2). There is accordingly an advantage that the electrostatic suppression performance of the tire is improved since the exposed portion of the grounding tread 5 is in constant contact with the road surface while the tire makes ground contact.

In the pneumatic tire 1, the resistivity of the coating rubber of the carcass layer 13, the resistivity of the coating rubber of the belt layer 14, and the resistivity of the rim cushion rubber 17 are each not more than $1 \times 10^{7}$ Ω·cm (see FIG. 1). The conductivity of the electrically conductive path from the rim 10 through the rim cushion rubber 17, the carcass layer 13, and the belt layer 14 to the grounding tread 5 is appropriately secured with such a configuration. As a result, there is an advantage that electrostatic suppression performance of the tire is improved.

The pneumatic tire 1 also includes the wing tips 153 disposed at the ends of the cap tread 151 (see FIG. 1). The wing tips 153 have a resistivity of not less than $1 \times 10^{8}$ Ω·cm. This configuration leads to the advantage that the wet performance of the tire is ensured.

The resistivity of the rim cushion rubber 17 of the pneumatic tire 1 is not more than $1 \times 10^{7}$ Ω·cm, and the cross-section height H from the side edge portion of the rim cushion rubber 17 and the tire cross-section height SH have a relationship of 0.20≤H/SH (see FIG. 1). As a result, there is an advantage that the contact surface area between the rim 10 and the rim cushion rubber 17 is secured and the conductivity from the rim 10 to the rim cushion rubber 17 is improved.

In the pneumatic tire 1, the bulging amount d of the widened portion 51 is such that 0.2 mm≤d≤1.0 mm (see FIG. 4). Consequently, there is an advantage that the bulging amount d of the widened portion 51 is made appropriate.

In the pneumatic tire 1, the base angle α of the widened portion 51 of the grounding tread 5 is such that 60°≤α≤80° (see FIG. 4). The bottom shape of the grounding tread 5 at the contact portion between the grounding tread 5 and the belt layer 14 is appropriately secured with such a configuration. As a result, there is an advantage that the electrical resistance is effectively reduced and steering stability can be maintained.

In the pneumatic tire 1, the height D1 of the entire grounding tread 5 and the height D2 of the widened portion 51 have a relationship of 0.1≤D2/D1≤0.3 (see FIG. 4). Consequently, there is an advantage that the height D2 of the widened portion 51 of the grounding tread 5 is appropriately secured and separation of the undertread 152 at the contact portion between the grounding tread 5 and the belt layer 14 is effectively suppressed.

EXAMPLES

FIGS. 6a-6e include a table showing results of performance testing of pneumatic tires according to embodiments of the present technology.

Evaluations related to (1) electrostatic suppression performance (electrical resistance value), (2) separation resistance performance, (3) dry/wet steering stability performance, and (4) low rolling resistance performance on a plurality of correspondingly different pneumatic tires were conducted in this performance testing (see FIGS. 6a-6e). In the performance tests, pneumatic tires with a tire size of 235/45R19 were assembled on a rim having a rim size of 19×8J; and an air pressure of 250 kPa and a maximum load defined by JATMA were applied to these pneumatic tires. The pneumatic tires were mounted onto four-wheel drive sedans as test vehicles with a displacement of 3.0 L.

(1) A voltage of 1000 V was applied under the conditions of an ambient temperature of 23° C. and a humidity of 50% for the evaluation of the electrostatic suppression performance. The electrical resistance value Ω between the tread road contact surface and the rim was measured. A smaller numerical value indicated a better discharge performance and thus was preferable.

(2) Evaluations related to separation resistance performance were conducted by durability testing using an indoor drum testing machine and the running distances until the tires burst were measured. Results of the evaluations were indexed and the index value of the pneumatic tire of the Conventional Example was set as the standard score (100) based on the measurement results. In these evaluations, higher scores were preferable.

(3) Evaluations related to dry/wet steering stability performance were conducted by driving the test vehicles on a certain test course under dry and wet road conditions to allow a professional test driver to conduct feeling evaluations on lane changing performance, cornering performance and the like. Results of the evaluations were indexed and the index value of the pneumatic tire of the Conventional Example was set as the standard score (100). Higher scores were preferable.

(4) Evaluations related to low rolling resistance performance were conducted by using an indoor drum testing machine to measure resistance force at a load of 4 kN and a speed of 50 km/h. Results of the evaluations were indexed and the index value of the pneumatic tire of the Conventional Example was set as the standard score (100). Higher scores indicated a lower rolling resistance and thus were preferable.

The pneumatic tires 1 of Working Examples 1 to 16 had the configuration depicted in FIGS. 1 to 4. The tire cross-section height SH was 100 mm, and the ratio H/SH was 0.50 (see FIG. 1). The resistivity of the grounding tread 5 was $1 \times 10^6$ Ω·cm and the loss tangent tan δ_et of the grounding tread 5 was 0.27. The height D1 of the grounding tread 5 was 9.0 mm. The contact length in millimeters of the grounding tread 5 and the belt layer 14 and undertread 152 was measured when seen as a cross-section in the tire meridian direction.

The grounding tread of the pneumatic tires of the conventional examples has a straight profile with a fixed width and extends from the tread road contact surface, when seen as a cross-section in the tire meridian direction, penetrating only the cap tread, to make a contact with the outer circumferential surface of the undertread. The grounding tread has the same resistivity and loss tangent as the pneumatic tire of Working Example 1. The undertread has a uniform gauge.

The grounding tread of the pneumatic tires of the comparative examples has a straight profile with a fixed width and extends from the tread road contact surface, when seen as a cross-section in the tire meridian direction, penetrating both the cap tread and the undertread, to make a contact with the outer circumferential surface of the belt layer. The grounding tread has the same resistivity and loss tangent as the pneumatic tire of Working Example 1. The undertread has a uniform gauge.

As can be seen from the test results, the pneumatic tires 1 of Working Examples 1 to 16 demonstrate improved tire electrostatic suppression performance and separation resistance performance.

What is claimed is:

1. A pneumatic tire comprising: a carcass layer; a belt layer being disposed on a periphery of the carcass layer; a tread rubber including a cap tread and an undertread; a pair of side wall rubbers; a pair of rim cushion rubbers; and a rubber grounding tread that is exposed to a road contact surface of the tread rubber and penetrates the cap tread and the undertread to contact the belt layer in an electrically conductive manner;
the grounding tread including a widened portion having a cross-sectional area that widens toward a contact surface with the belt layer at a contact portion with the belt layer;
the widened portion of the grounding tread having a profile shape that bulges outward in a tire width direction;
the undertread including a thickened portion that has a gauge that increases toward each contact surface with the grounding tread at the portion of the grounding tread penetrating the undertread; and
a gauge G1 of a flat portion of the undertread and a gauge G2 of the thickened portion of the undertread have a relationship of $1.5 \leq G2/G1 \leq 2.5$.

2. The pneumatic tire according to claim 1, wherein: the cap tread has a resistivity of not less than $1 \times 10^{10}$ Ω·cm and the grounding tread has a resistivity of not more than $1 \times 10^6$ Ω·cm.

3. The pneumatic tire according to claim 2, wherein the undertread has a resistivity of not more than $1 \times 10^{10}$ Ω·cm.

4. The pneumatic tire according to claim 1, wherein: a width W1 of the grounding tread at the tread road contact surface and a width W2 of a contact surface of the grounding tread with the belt layer have a relationship of W1<W2.

5. The pneumatic tire according to claim 4, wherein the width W1 and the width W2 of the grounding tread are such that 0.5 mm≤W1≤2.0 mm and 1.0 mm≤W2≤3.0 mm.

6. The pneumatic tire according to claim 1, wherein the grounding tread extends along the entire tire circumference.

7. The pneumatic tire according to claim 1, wherein: the carcass layer is constituted by a plurality of carcass cords covered by a coating rubber, the belt layer is constituted by a plurality of belt cords covered by a coating rubber, and a resistivity of the coating rubber of the carcass layer, a resistivity of the coating rubber of the belt layer, and a resistivity of the rim cushion rubbers are each not more than $1 \times 10^7$ Ω·cm.

8. The pneumatic tire according to claim 1, further comprising: rubber wing tips disposed at the ends in the tire width direction of the cap tread,
a resistivity of the wing tips being not less than $1 \times 10^8$ Ω·cm.

9. The pneumatic tire according to claim 1, wherein: a resistivity of the rim cushion rubbers are each not more than $1 \times 10^7$ Ωcm, and a cross-section height H from the tire rim diameter measurement point to the exposed surface radially outermost side edge portion of the rim cushion rubbers and a tire cross-section height SH have a relationship of 0.20≤H/SH.

10. The pneumatic tire according to claim 1, wherein the widened portion of the grounding tread has a profile shape in which the right and left side portions bulge in the tire width direction while widening toward the contact surface with the belt layer and a bulging amount d of the widened portion of the grounding tread on each of the right and left side portions is such that 0.2 mm≤d≤1.0 mm.

11. The pneumatic tire according to claim 1, wherein the widened portion of the grounding tread has a profile shape in which the right and left side portions bulge in the tire width direction while widening toward the contact surface with the belt layer and a base angle α of the widened portion of the grounding tread on each of the right and left side portions is such that 60°≤α≤80°.

12. The pneumatic tire according to claim 1, wherein: a radial height D1 of the entire grounding tread and a radial height D2 of the widened portion have a relationship of 0.1≤D2/D1≤0.3.

13. The pneumatic tire according to claim 1, wherein:
the cap tread has a resistivity of not less than 1×10^10 Ω·cm and the grounding tread has a resistivity of not more than 1×10^6 Ω·cm; and
the undertread has a resistivity of not more than 1×10^10 Ω·cm.

14. The pneumatic tire according to claim 1, wherein:
a resistivity of the rim cushion rubbers are each not more than 1×10^7 Ωcm, and a cross-section height H from the tire rim diameter measurement point to the exposed surface radially outermost side edge portion of the rim cushion rubbers and a tire cross-section height SH have a relationship of 0.20≤H/SH;
the widened portion of the grounding tread has a profile shape in which the right and left side portions bulge in the tire width direction while widening toward the contact surface with the belt layer and a bulging amount d of the widened portion of the grounding tread on each of the right and left side portions is such that 0.2 mm≤d≤1.0 mm;
a base angle α of the widened portion of the grounding tread on each of the right and left side portions is such that 60°≤α≤80°; and
a radial height D1 of the entire grounding tread and a radial height D2 of the widened portion have a relationship of 0.1≤D2/D1≤0.3.

* * * * *